US008335576B1

(12) United States Patent
Bradshaw et al.

(10) Patent No.: US 8,335,576 B1
(45) Date of Patent: Dec. 18, 2012

(54) METHODS AND APPARATUS FOR BRIDGING AN AUDIO CONTROLLER

(75) Inventors: John Richard Bradshaw, Vancouver (CA); David Victor Hobbs, Surrey (CA); Shane Michael Waskiewich, Vancouver (CA); Kevin Mlazgar, Vancouver (CA)

(73) Assignee: Teradici Corporation, Burnaby (CA)

( * ) Notice: Subject to any disclaimer, the term of this patent is extended or adjusted under 35 U.S.C. 154(b) by 1853 days.

(21) Appl. No.: 11/534,600

(22) Filed: Sep. 22, 2006

Related U.S. Application Data

(60) Provisional application No. 60/719,823, filed on Sep. 22, 2005.

(51) Int. Cl.
*G06F 17/00* (2006.01)
(52) U.S. Cl. ............... 700/94; 710/22; 710/26; 710/52; 710/308
(58) Field of Classification Search .............. 700/94
See application file for complete search history.

(56) References Cited

U.S. PATENT DOCUMENTS

| | | | |
|---|---|---|---|
| 6,633,934 B1 | 10/2003 | Thornton | |
| 6,748,473 B1 | 6/2004 | Shatas et al. | |
| 2002/0004840 A1* | 1/2002 | Harumoto et al. | 709/231 |
| 2002/0071436 A1* | 6/2002 | Border et al. | 370/395.32 |
| 2002/0123895 A1* | 9/2002 | Potekhin et al. | 704/275 |
| 2002/0199047 A1 | 12/2002 | DuPont et al. | |
| 2003/0191857 A1* | 10/2003 | Terrell et al. | 709/244 |
| 2004/0015551 A1 | 1/2004 | Thornton | |
| 2004/0080526 A1 | 4/2004 | Thornton | |
| 2004/0083302 A1 | 4/2004 | Thornton | |
| 2004/0193296 A1* | 9/2004 | Melanson | 700/94 |
| 2005/0182962 A1* | 8/2005 | Given et al. | 713/200 |
| 2006/0034326 A1* | 2/2006 | Anderson et al. | 370/466 |
| 2006/0041895 A1* | 2/2006 | Berreth | 719/328 |
| 2006/0074637 A1* | 4/2006 | Berreth | 704/201 |
| 2006/0195881 A1* | 8/2006 | Segev et al. | 725/116 |
| 2006/0206618 A1* | 9/2006 | Zimmer et al. | 709/231 |

OTHER PUBLICATIONS

Intel HD audio specification: copyright 2004.*
Church, Steve, "Ethernet for Studio Audio Systems", http://www.axiaaudio.com/tech/ethernet4audio/NAB03_CHURCH_FINAL_2.pdf, 12 pages.
Crutcher, Laurence et al., "The Networked Video Jukebox", IEEE Transactions on Circuits and Systems for Video Technology, Apr. 2, 1994, vol. 4, No. 2, pp. 105-120, IEEE, New York, NY, USA.
CS18101 Cobranet™ Product Bulletin, Cirrus Logic Inc., Mar. 2004, 2 pages, Austin, TX, USA.
Levergood, Thomas M., "AudioFile: A Network-Transparent System for Distributed Audio Applications", USENIX Summer 1993 Technical Conference, Jun. 21-25, 1993, pp. 219-236, (19 pages), Cincinnati, Ohio, USA.

* cited by examiner

*Primary Examiner* — Paul McCord
(74) *Attorney, Agent, or Firm* — Lewis and Roca LLP

(57) ABSTRACT

The present invention enables the transparent bridging of an audio controller over a network between a host PC and a remote user interface system by providing a host module that presents the interface of an audio controller to a system bus of a host computer and a remote module that presents an audio link interface to codecs in a remote system. By bridging the controller at these interfaces, the effects of network delays and data loss can be controlled inside the user's human perception limits without introducing signal timing problems at the two specified interfaces.

7 Claims, 13 Drawing Sheets

METHODS AND APPARATUS FOR BRIDGING AN AUDIO CONTROLLER

CROSS-REFERENCE TO RELATED APPLICATIONS

This application claims priority to U.S. Provisional Patent Application Ser. No. 60/719,823, filed Sep. 22, 2005.

FIELD

The invention relates generally to methods for providing an audio interface. More specifically, the invention describes a method for bridging an audio controller across a shared network between a host PC and a remote user interface.

BACKGROUND

Historic advances in computer technology have made it economical for individual users to have their own computing system, which caused the proliferation of the Personal Computer (PC). Continued advances of this computer technology have made these personal computers very powerful but also complex and difficult to manage. For this and other reasons there is a desire in many workplace environments to separate the user interface devices, including the display, keyboard, mouse, audio and the peripheral devices from the application processing parts of the computing system. In this preferred configuration, the user interface devices are physically located at the desktop, while the processing and storage components of the computer are placed in a central location. The user interface devices are then connected to the processor and storage components with some method of communication.

One of the more challenging aspects of separating the user interface from the processing system is the provision of an audio interface at the remote user site with the features and capabilities expected of a desktop PC. Existing remote user interface systems with limited audio capabilities are described below.

The first method is an audio data stream transfer method used by remote desktop applications such as VNC or RDP. Audio information is obtained by the host operating system in conjunction with application software such as Speak Freely and transferred over the communication system using remote desktop protocols to an operating system or application at the remote user interface system. This method is inherently dependent on the host operating system and consequently loads the host data processor with encoding and decoding operations. The operating system is also required to respond to the continuous stream in real time to avoid delays, drop-outs or latency may be detected by the human ear or introduce lip synchronization problems in video applications.

The second method is an audio capture and transfer method. The audio stream is captured only after it has been converted to an analog stream. An application on the host data processor digitizes the audio stream, compresses it and transfers it over the network to an application running on a remote computer, where it is played out through the remote computer's audio drivers and hardware. This introduces a number of delays, operating system dependencies and performance impact on other applications executing on the data processor. In order for full duplex capability to be supported, the method also requires equivalent digitization circuitry and software application support at the remote user system to transfer audio streams back to the host. Another problem with the audio capture and transfer method is that the audio codec and supporting analog circuitry must have extended capabilities to allow any supported codec to operate at optimal performance in terms of channel number, frequency response, dynamic range etc. For example, an audio signal from a microphone input has significantly different characteristics to a CD quality audio line driver. PC audio circuit normally uses an analog audio mixer between the digital to analog converter (DAC) and the analog to digital converters (ADC) to support the wide dynamic range. The circuitry used by the audio capture and transfer method does not have the analog mixing capability and therefore is not capable of supporting the wide dynamic range needed for high quality audio.

Both of the methods described above are reliant on application software or operating system functions at the remote user interface to enable audio functions. However, much of the motivation behind separating the remote user from the data processor is to reduce the complexity and software dependence of the remote user in order to reduce maintenance overheads and equipment costs. These methods do not achieve this objective.

The third method is an audio physical layer extension method that can be found with KVM audio extensions or audio-over-power line methods that do not rely on software at the remote user. Rather than being digitized, the analog audio signal is amplified or modulated and transmitted over a proprietary analog connection. This method is incompatible with standard networks, requiring additional cabling and increasing equipment and maintenance costs. Furthermore, analog transmission introduces noise to the audio signal and the quality degrades as the cabling is extended, limiting the useful distance over which audio may be transferred.

The fourth method that does not have the distance limitation and signal degradation problems described is the Ethernet audio networking method found in professional grade digital audio mixing environments based on devices like the Cirrus Logic Cobranet™ audio interface. A driver on the data processing system captures digital audio information and communicates it across a dedicated Ethernet network to a client or pier system. This method is supported over standard cabling and in the case of simple client decoders, software at the client system is not required. Systems using this method are limited to layer 2 networking protocols, requiring a pre-defined network topology with dedicated wiring. Although Ethernet is used, proprietary network protocols are used at a higher layer to preserve the real time performance rendering the solution incompatible with corporate LAN infrastructure. Other systems such as Livewire by Axia Audio do use IP over Ethernet but require specialized operating system functions and drivers to meet real-time demands.

In summary, existing methods that support remote user interfaces either require software at the remote system or have limited and noise-susceptible audio connectivity. Other solutions support high quality audio over Ethernet but require customized operating system, application software and hardware architecture at the data processor to support the real-time processing requirements for an audio system. Therefore, a better method for providing an audio connection between the data processor and the remote user interface is needed.

SUMMARY

The present invention enables the transparent bridging of an audio controller over a network between a host PC and a remote user interface system by providing a host module that presents the interface of an audio controller to a system bus of a host computer and a remote module that presents an audio link interface to codecs in a remote system. By bridging the controller at these interfaces, the effects of network delays and data loss can be controlled inside the user's human perception limits without introducing signal timing problems at the two specified interfaces.

In one aspect, a method for communicating audio information between a host audio controller module and a client audio controller across a network is described. Unlike previous methods, the described method executes in conjunction with generic audio interfaces and data structures in the host environment, precluding any need for bridging drivers. Furthermore, no matching application or application operating system is required at the remote client. In another aspect, a method for detecting under-run conditions in an outbound audio stream at a client audio controller module is described. The described method notifies the host controller and host audio software is prompted using standard error handling methods even though the condition occurs at a remote location.

In another aspect, a method for establishing that inbound audio streams have been terminated by detecting discontinuities in an inbound audio stream at a client audio controller module is described. When all streams are terminated, the host controller is notified so that packet buffers at the host controller module may be disabled as a means for reducing the latency of subsequent inbound responses.

In another aspect, a method for using the number of frames in a client side packet buffer as an indication of an outbound frame rate at a host audio controller module is described. Based on the calculated fill level, the frame rate of the host audio controller is adjusted so that the frame processing rate at the host system matches the frame processing rate at the client system.

In summary, the invention enables a remote audio system that operates across a shared network without the overheads of special audio drivers, remote software or a matching remote operating system.

DETAILED DESCRIPTION

Figure 1:
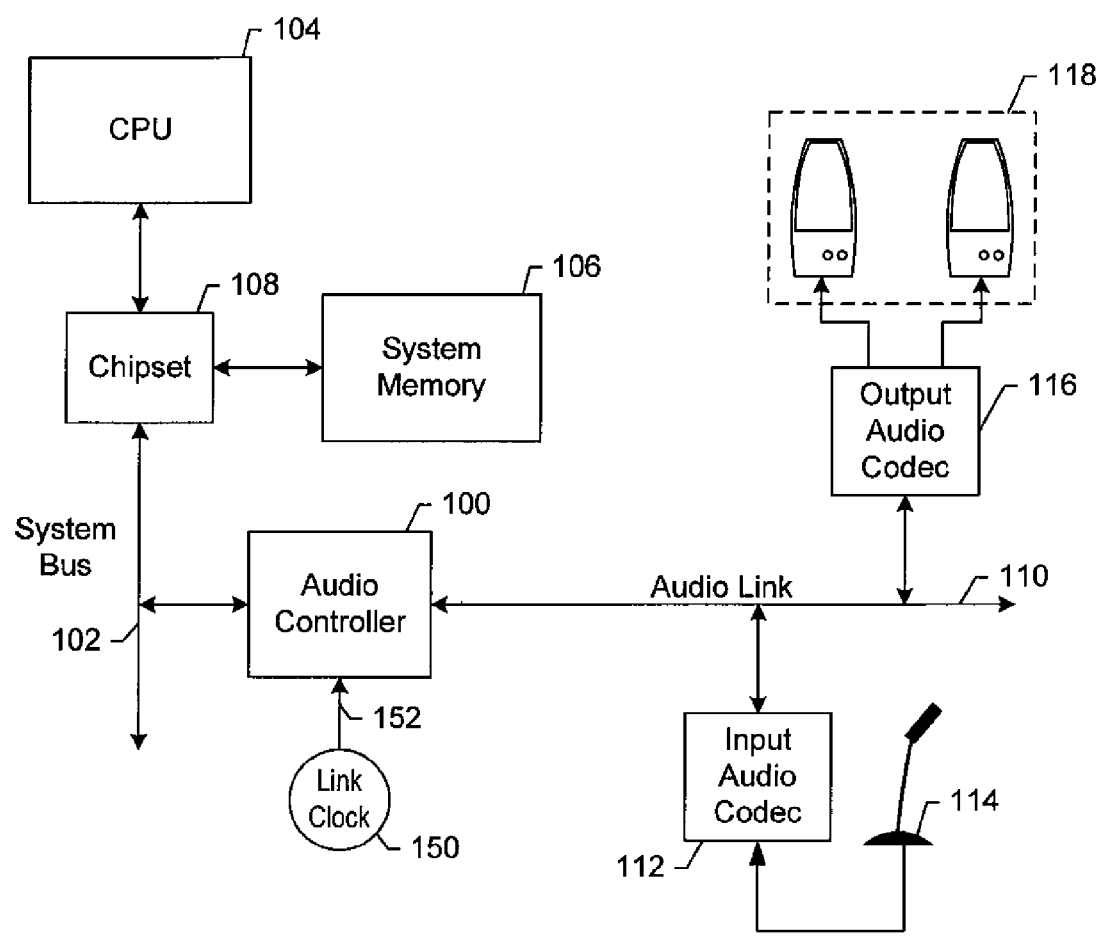
FIG. 1 illustrates a generic audio subsystem architecture of a standard PC platform useful for introducing system interfaces and components.

FIG. 1 shows a generic audio subsystem architecture of a standard PC platform useful for introducing system interfaces also used by the present invention. In the embodiment shown, audio controller 100 connects to system bus 102 of a standard PC system incorporating CPU 104 connected to system memory 106 and system bus 102 by chipset 108. Examples of bus 102 include Peripheral Component Interconnect (PCI) or PCI Express (PCI-E). A variety of alternative embodiments exist too, including different system memory configurations, north and south bridge architectures and system bus architectures. In a typical PC configuration, audio controller 100 is also connected to at least one audio codec by audio link 110 which may be one of several publicly-defined audio buses, including serial buses such as specified by HD Audio and AC '97 Audio specifications. In the embodiment shown, input audio codec 112 provides an interface between microphone 114 and link 110. Output audio codec 116 provides an interface between speakers 118 and link 110.

System memory 106 includes publicly specified data structures that enable a standardized interface between an audio application with audio drivers executing on CPU 104 and one or more peripheral devices. In an HD Audio embodiment, the data structures include virtual cyclic buffers that hold the audio data, buffer descriptor lists that track the sample segments associated with audio streams for each data stream, a command buffer for queuing codec bound commands (termed a Command Output Ring Buffer (CORB) in an HD Audio embodiment) and a response buffer (termed a Response Input Ring Buffer (RIRB) in an HD Audio embodiment) for queuing audio responses from a codec bound for CPU 104. HD Audio also uses data structures that track the DMA position in each active buffer for the purposes of letting audio controller 100 inform CPU 104 of buffer status. Audio controller 100 and CPU 104 access these described data structures in system memory, enabling a publicly specified path between audio software on CPU 104 and the codec(s).

In the embodiment shown, link clock 150 provides the timing for link 110 via clock signal 152 connected to audio controller 100. Other embodiments (such as AC '97) recommend connection to an audio codec. The system timing is selected to ensure minimal queuing of data between memory 106 and link 110.

Figure 2:
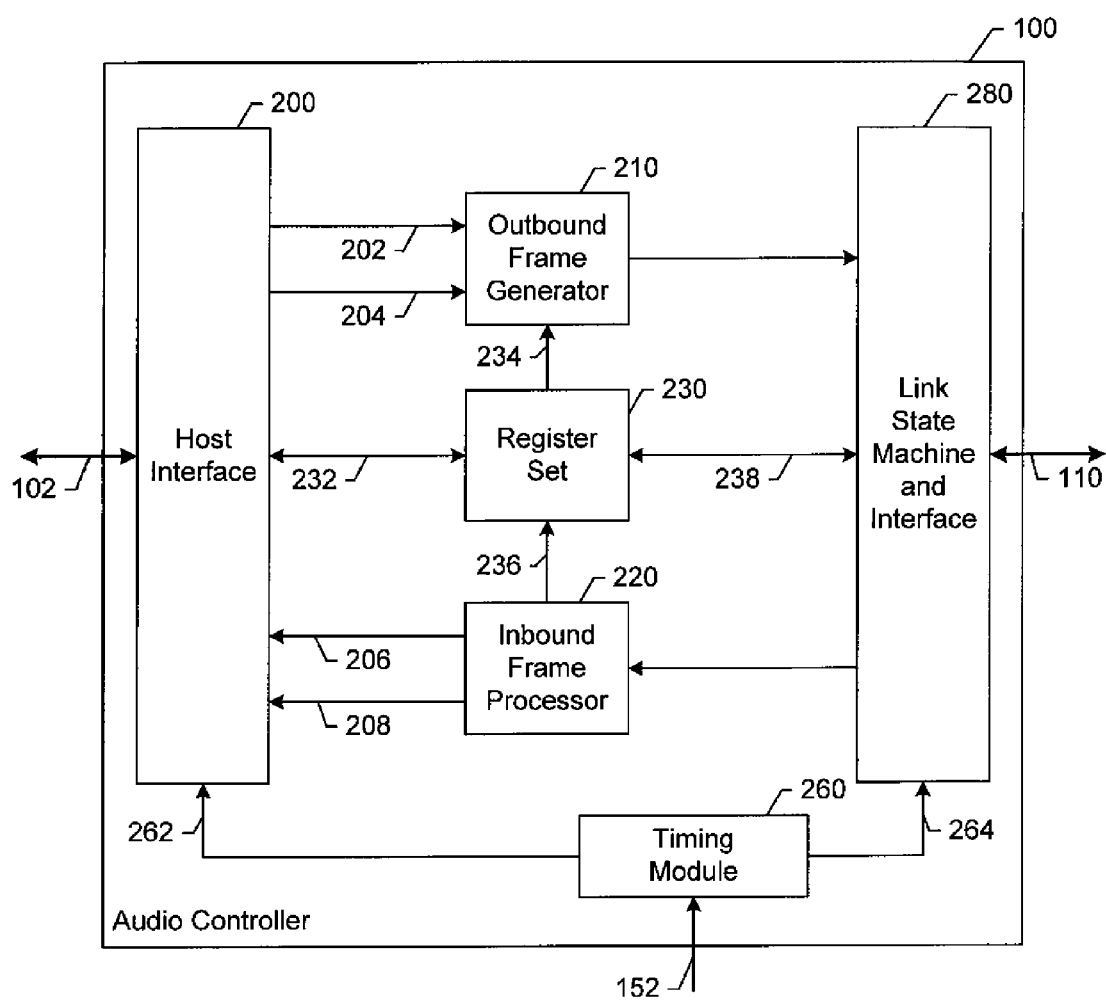
FIG. 2 illustrates a generic embodiment of an audio controller.
Figure 3:
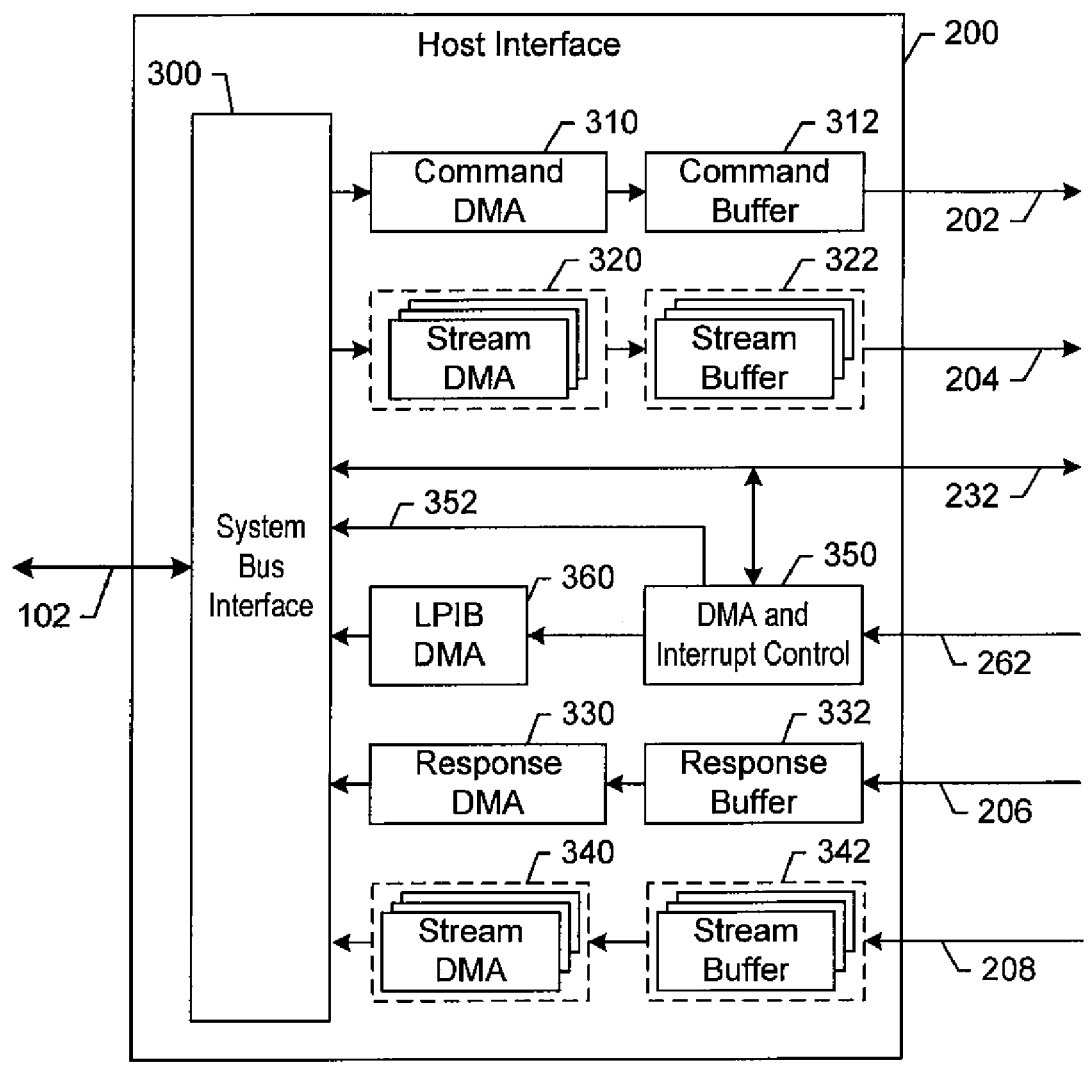
FIG. 3 illustrates a host interface module.
Figure 4:
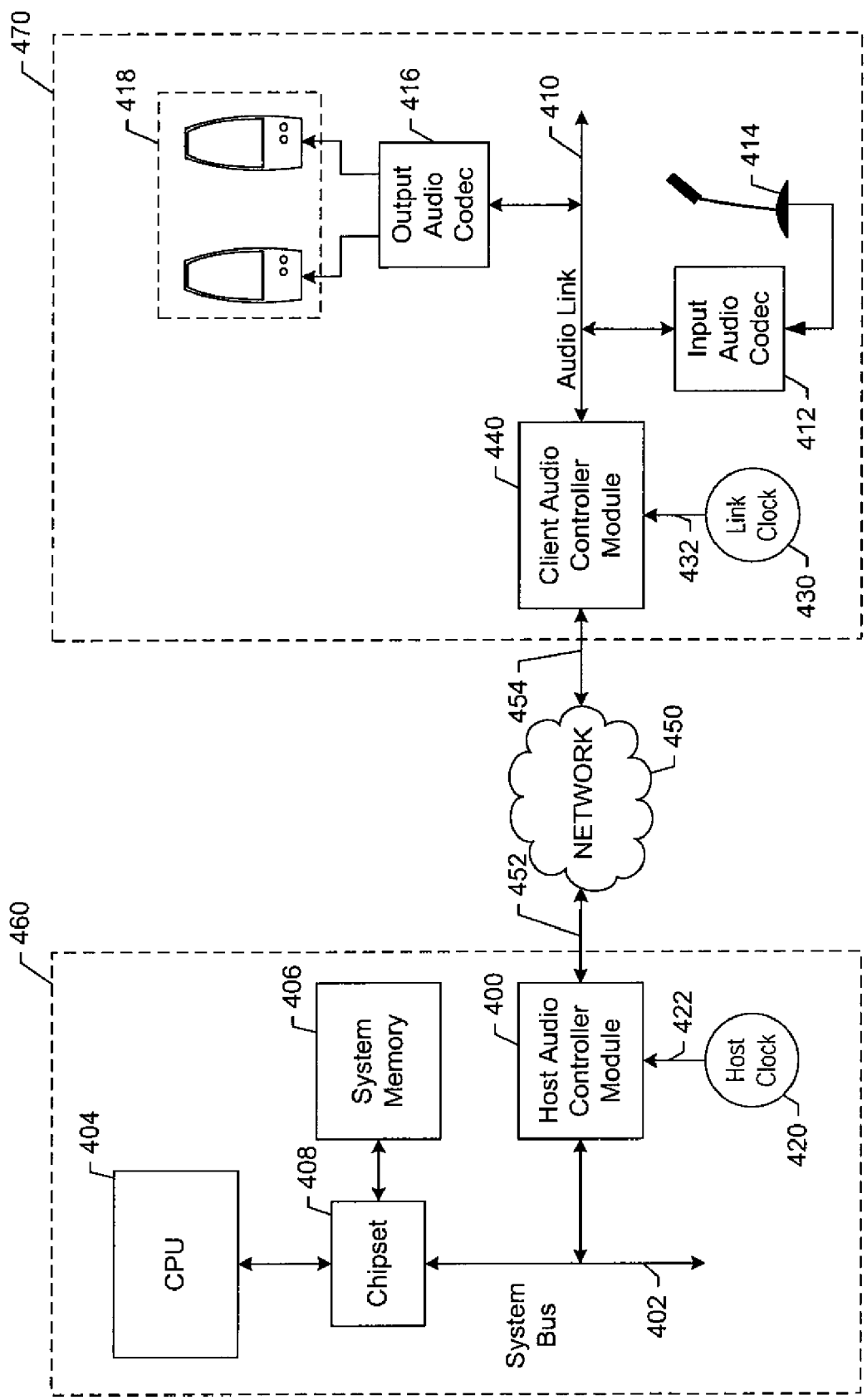
FIG. 4 shows a system architecture in which an audio controller is bridged across a network.

FIG. 2 illustrates audio controller 100 introduced in FIG. 1 that has similar system bus and audio link interfaces to those used by the present invention introduced in FIG. 4. Audio controller 100 incorporates host interface 200 detailed in FIG. 3 that provides a physical and data management interface between bus 102 and modules internal to the controller. Host interface 200 provides managed access to data types, including command interface 202 for CORB access, output audio stream interface 204, response interface 206 for RIRB access, input audio stream interface 208 and register interface 232. Host interface 200 operates at a timing interval determined by standard timing module 260 clocked by clock signal 152.

In an outbound direction from host interface 200 to link 110, outbound frame generator 210 multiplexes codec commands from command interface 202 and output audio stream data from stream interface 204 to form standard audio frames which are written to an outbound frame queue in link state machine and interface 280 which is sufficiently sized to buffer two or three outbound frames. Interface 280 serializes the frames and transmits them over link 110 using a standard link protocol which conveys audio data, codec commands and responses, control information, and distributes the sample rate base time while supporting a variety of sample rates and sizes. Interface 280 operates at a synchronous frequency of 24 MHz driven by link timing signal 264 derived from clock signal 152 and scaled by timing module 260. In an inbound direction, de-serialized frames are stored in an inbound frame queue in interface 280 until read by inbound frame processor 220. Processor 220 de-multiplexes codec responses and input audio streams which are written to system memory via response interface 206 and input audio stream interface 208 respectively in preparation for DMA transfer to the host.

Audio controller register set 230 provides a memory-mapped interface for control and data parameters specified in the HD Audio specification which are accessible by CPU 104 via register interface 232. In the HD Audio embodiment described, initialization, programming and control of register set 230 are all described in the HD Audio specification. Interface 280 also has access to registers 230 via register interface 238 to support link initialization and power management. In the embodiment, immediate command interface 234 may be used as an alternative codec command path to command interface 202 and immediate response interface 236 may be used as an alternative codec response path to response interface 206.

Clock signal 152 is connected to timing module 260 that provides both link timing 262 for link 110 and DMA timing signal 264 for the DMA modules in host interface 200. Timing module 260 also provides wall clock counter functions to support codec synchronization. In a PC architecture, bus 102 and link 110 are available as publicly available specifications known to those skilled in the art that define the number of connections, signal types, signal levels and timings requirements etc., enabling compatibility between different audio controllers and the system bus as well as compatibility between codecs and audio controllers supplied by different vendors. One aspect of the present invention is the preservation of the specified operation of these interfaces and associated driver software, although the scope of the specification is not limited to publicly available specifications.

FIG. 3 illustrates host interface 200 in FIG. 2, provided as host interface enablement detail as a host interface with equivalent functionality is used by the present invention. System bus interface 300 includes standard physical, data link and transaction layer hardware in addition to configuration management logic that enables mapping between bus 102 and modules internal to host interface 200. In the described embodiment, system bus interface 300 is a PCI-E core logic interface.

Host interface 200 uses one or more Direct Memory Access controllers (DMAs) to move codec commands, codec responses and audio streams (where each audio stream is comprised of at least one audio channel) between local buffers and system bus 102. Each DMA controller may be tasked with managing multiple DMA streams. In the embodiment shown, command DMA 310 is an outbound DMA that reads data from the CORB in memory 106 and writes it to local command buffer 312. Stream DMA 320 is an outbound DMA that manages the transfer of multiple output audio streams from cyclic output audio buffers in memory 106 to local stream buffer 322. In the embodiment illustrated, a separate DMA channel and buffer is allocated for each output audio stream and output audio data is stored in host memory container format (per HD Audio specification). Response DMA 330 is an inbound DMA that reads data from local response buffer 332 and writes it to the RIRB in memory 106. Stream DMA 340 is an inbound DMA that manages the transfer of multiple input audio streams from local stream buffer 342 to cyclic input audio buffers in memory 106. In the embodiment illustrated, a separate DMA channel and buffer is also allocated for each input audio stream and input audio is also stored in host memory container format. Link Position in Buffer (LPIB) DMA 360 updates buffer positions for inbound and outbound stream DMAs to a location in memory 106. DMA and Interrupt Control Module 350 distributes DMA timing signal 262 between the DMA modules shown, maintains DMA-related registers and provides interrupt control logic to support controller-initiated bus interrupts signal 352.

FIG. 4 shows a system architecture in which an audio controller is bridged across a network. In the embodiment, host interface functions including those described in FIG. 3 and bridging functions described by the present invention are located at a host PC while complementary bridging and audio link interface functions are located at a client system with audio peripherals at another location on the network. Referring to FIG. 4, host system 460 includes standard PC components CPU 404, system memory 406 and chipset 408 which are identical to equivalent named components in FIG. 1. System bus 402 also supports identical functionality to bus 102 in FIG. 1. Client system 470 includes audio link 410 which is identical to link 110 in FIG. 1 and provides the audio data connection for input audio codec 412 with microphone 414 and output audio codec 416 with speakers 418, all of which are identical to equivalent named components in FIG. 1.

The connections (including audio streams or other data, in addition to codec commands and codec responses) between host system 460 and client system 470 are bridged across network 450 using a pair of bridging apparatus and methods described by the present invention. Host system 460 includes host audio controller module 400 connects to bus 402 in an identical manner to that in which audio controller 100 connects to bus 102 in FIG. 1 and also to network 450 using network interface 452. At client system 470, client audio controller module 440 connects to audio link 410 in an identical manner to the connection between audio controller 100 and audio link 110 in FIG. 1 and also to network 450 using network interface 454. By providing a bridging apparatus and methods that maintain these publicly specified interfaces, the stream management structure of a publicly specified audio controller is also preserved. Furthermore by bridging the controller at these interfaces, the effects of network delays and data loss can be controlled inside the user's human perception limits without introducing signal timing problems at the specified interfaces.

In order to bridge the audio connection at the identified interfaces, several system design problems are addressed. Firstly, the introduction of a variable delay network requires two independent clock systems as the original synchronous system described in FIG. 1 is no longer feasible. Specifically, DMA timing (ref signal 262 in FIG. 2) cannot be directly derived from a link timing module located across a network. The described solution uses host clock 420 with clock signal 422 to supply timing for module 400 in host system 460 and link clock 430 with clock signal 432 to supply timing for module 440 in client system 470. Then synchronization methods are used to ensure synchronization between the two modules. Timing synchronization methods are detailed later in the specification. A second problem is that the bridged connection must ensure that state machines in audio software on CPU 404 and audio codecs (412 and 416) operate as specified even when separated by a network. To achieve this, a reliable network protocol is used for the communications of commands, responses and control information that ensures command order between the host and codec is maintained and system state remains deterministic. Methods are also introduced for managing data underflow and discontinuities. Additionally, system initialization methods are modified to account for network latencies by providing predicted codec responses to the audio drivers during codec initialization and managing other aspects of a high latency initialization sequences. For example, the HD Audio specification mandates that the RUN bit transition from 0 to 1 within a 40 microsecond period which is not practical in a networked environment with delays in the order of milliseconds.

Thirdly, the introduction of a variable delay network and a desire for packet aggregation efficiencies requires the replacement of shallow inbound and outbound data queues with multi-frame packet buffers. The packet buffers absorb variations in network latency and enable the transfer of audio streams without starving DMA controllers (which may result in gaps in an audio stream causing choppy playout). The depth of the packet buffers is also optimized to balance between the risk of overflowing in the case of shallow buffers and the risk of excessive buffering resulting in excessive latency.

Other problems are also solved by different embodiments. For example, in one embodiment, a recovery mechanism is used to minimize the impact of lost audio packets in cases where a best efforts network protocol such as UDP/IP is used to transfer the audio streams. In another embodiment, signal processing and compression methods are used to enable the compression of audio streams, improving performance over limited availability networks.

Figure 5:
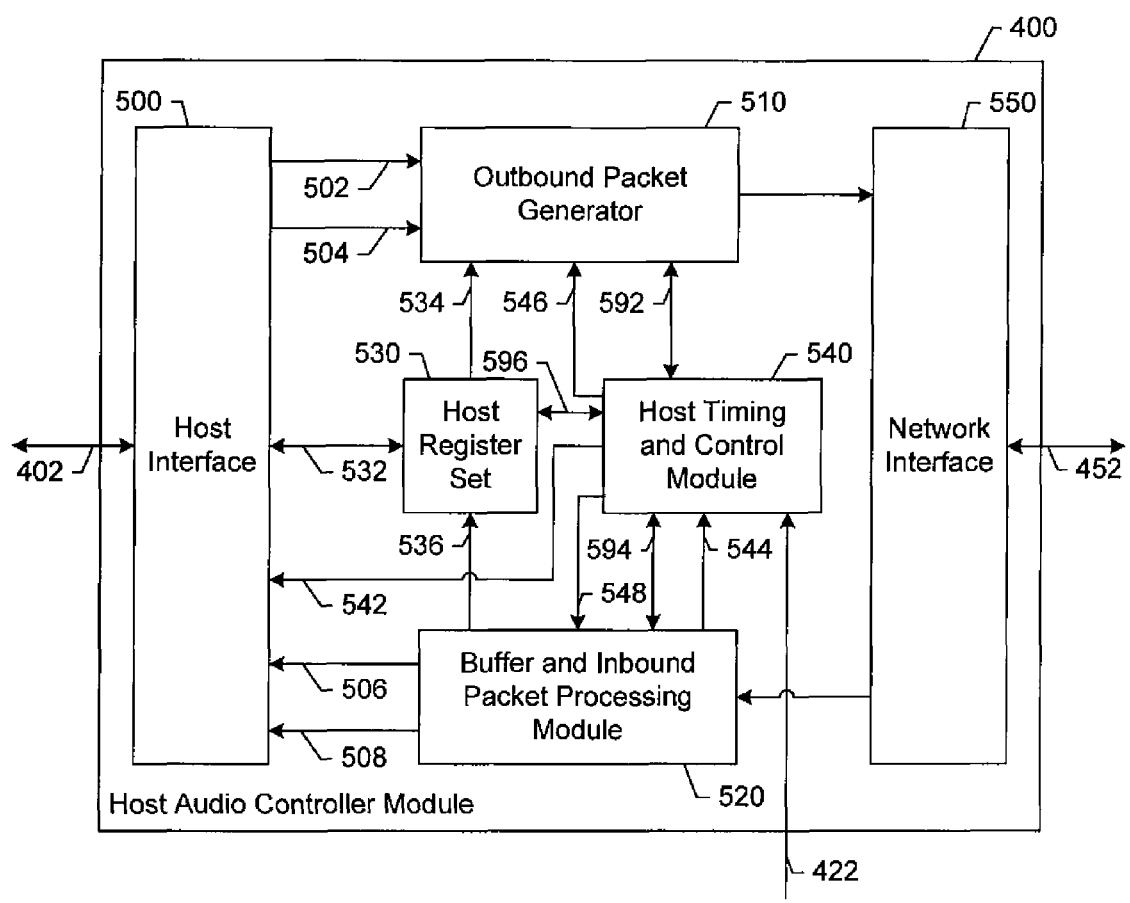
FIG. 5 shows an HD Audio embodiment of a host audio controller module.

FIG. 5 shows an HD Audio embodiment of host audio controller module 400 in FIG. 4. In the described embodiment, host audio controller module 400 is comprised of host interface 500 with the same functions, architecture, data interfaces and operation methods as host interface 200 detailed in FIG. 3.

Comparing host interface 500 in FIG. 5 to host interface 200 in FIG. 2, command interface 502 is equivalent to command interface 202, output audio stream interface 504 is equivalent to outbound stream interface 204, response interface 506 is equivalent to response interface 206, input audio stream interface 508 is equivalent to inbound stream interface 208 and register interface 532 is equivalent to register interface 232. In the described embodiment, outbound packet generator 510 assembles output audio data streams and codec commands and generates packets comprising an integer number of audio frames. In an alternative embodiment, individual frames may straddle multiple packets. As described in FIG. 3, output audio data on interface 504 is in host memory container format. Packet generator 510 converts these samples into tightly-packed audio frame format for each stream. As one example, three 20-bit samples may be necessary for a 20.83 microsecond audio frame. These samples are stored in three 32-bit containers and repacked into a 64-bit segment. Packet generator 510 initiates a cadence generator for each output audio stream using the HD Audio specified Stream Format registers (MULT, CHAN, and BITS) to determine the number of host memory container format samples needed per stream packet as well as the stream packet sizes. The number of host memory container samples determines how many host memory containers must be read from stream interface 504 and packed into each stream packet. A sub-multiple cadence generator (based upon the DIV parameter of the Stream Format registers) is also initiated for each stream that is a sub-multiple of the base 48 KHz or 44.1 KHz rate. For streams with a 44.1 KHz base rate (BASE parameter of the Stream Format registers), a cadence generator provides 44.1 KHz timing for frames that would normally have a sample block (if they were 48 KHz and taking into account the sub-multiple cadence generator).

Packet generator 510 uses frame timing signal 546 from host timing and control module 540 to provide frame boundaries and gets the correct amount of data from each stream required for each frame, where each stream may have a different sample rate. Packet generator 510 does not generate audio packets when host audio controller module 400 is placed in reset (i.e. when CRST# is asserted) so all audio data pipelines are halted and flushed. In addition, the stream buffer (such as buffer 322 in FIG. 3) is disabled allowing the transfer of control information and codec commands to be prioritized at low latency. In order to maximize the largest contiguous block of commands and ensure back-to-back command transfer on the link without any spurious frame gaps, a new packet is initiated in the case when a codec command arrives after a defined number of streams have already been placed in that packet. To ensure timely transfer of codec commands in cases where all streams are inactive, a frame including a codec command (but without audio stream data) is generated and added to the present packet in any case when a codec command is available. In cases where streams are active, codec commands are multiplexed with audio data in a ratio of one command per frame (when commands are available in the command buffer (such as buffer 312 in FIG. 3) as found in a standard link frame format. Packet generator 510 does not include streams that have their associated stream synchronization flag (SSYNC) or stream reset flag (SRST) asserted. If the RUN flag for a particular stream is de-asserted, the cadence generator is initialized and restart when RUN is once again asserted. In addition, if RUN is de-asserted for a particular stream, audio data for that stream is not transmitted once the present frame has been processed. Bridge operational control information destined for client audio controller module 440 (FIG. 4) is appended to the packet header.

Operational control information includes outbound packet buffer activation/de-activation instructions and active/inactive stream status information. Certain register information is also communicated. Host register set 530 comprises the same register information as registers 230 in controller 100. The update of registers such as CRST# and SRST (associated with incoming streams) results in control information being inserted in the headers of outgoing frames for communication to module 444. Packet generator 510 monitors changes to register values that trigger frame header updates or other operational changes as described above using register interface 534 and updates frame headers or changes operational mode accordingly. For example, codec control information such as CRST# and SRST information is embedded in the frame header (as specified in the HD Audio specification).

Completed outbound packets are then forwarded to network interface 550. Network interface 550 provides network protocol encapsulation and forwards the packets over connection 452. In one embodiment, network interface 550 marks audio packets for priority transfer using QoS characterization. One example of QoS characterization is the setting of the TOS field in the MAC header that enables prioritization of the audio packet through switches across the network. Packet generator 510 also manages data under-run and overflow conditions. In a case where a data under-run on output audio interface 504 occurs, an HD AUDIO empty FIFO interrupt (FIFOE) is triggered and the frame multiplexing continues with no data being inserted for that stream. In one embodiment, client module 440 detects an under-run in the output frame queue and transmits the under-run error status in a packet to host module 400 that in turn triggers a FIFOE error.

Buffer and inbound packet processing module 520 provides packet buffers for input audio streams and processes inbound packets and frames at a rate defined by inbound frame timing signal 548 from module 540. Inbound packet processing functions include processing embedded operational control information and audio frames present in the packet payload. Timing parameters and control information are extracted from the packets and forwarded to module 540 over control interface 544. Codec responses are extracted and forwarded to interface 506. In one embodiment, a response filter in module 520 may be used to filter inbound codec responses by blocking a predefined subset of responses. In another embodiment, codec responses are returned to register set 530 across immediate response interface 536 rather than interface 506. One embodiment uses a reliable transport protocol so no packet lost detection is required. In the embodiment, no attempt is made to detect if packets are excessively delayed since it is expected that the packet buffer is correctly sized. If an audio frame is not available due to the packet buffer being empty while it is enabled, an error has occurred and frame de-multiplexing waits for the next available frame. Once a frame is available, it is broken into its constituent pieces and the samples converted to host memory container format as defined by values in register set 530. The separate input audio streams are then forwarded to stream buffers over stream interface 508. If module 520 detects the negation of the HD Audio SSYNC signal for a stream, the stream data is converted to host memory container format then forwarded to interface 508. If SSYNC is asserted, all incoming data for that stream is dropped. If module 520 detects the assertion of a stream reset bit (SRST) for an input audio stream, all stream data is dropped and the fill level for the associated stream buffer cleared until the stream reset signal has been looped back from the client system over control interface 544. If module 520 detects the negation of the RUN flag for a stream, all incoming data for the stream is dropped after the present frame is processed. Note that module 520 performs state changes only after the present frame has been processed.

Module 520 also hosts a packet buffer for input audio streams. Upon startup, the packet buffer is disabled and inbound packets are immediately processed. This allows initial communication comprising register updates and codec responses to be processed rapidly. Once a stream is activated (via codec commands), input audio stream data from the codec starts flowing from module 440 (in FIG. 4) and the packet buffer for the stream is initialized under control of operational control information communicated from module 440 in the inbound packet header. Once a buffer threshold is reached (for example using the priming method described in FIG. 9), packet de-multiplexing commences and continues until an appropriate number of input audio packets have been buffered. The optimum buffer depth is based on network latency and may be a fixed or programmable value. Once a sufficient number of packets are buffered, processing of packets continues. When client module 440 detects that a codec is no longer generating input data (for example using the discontinuity detection method described in FIG. 10), the corresponding inbound packet buffer is de-asserted via operational control information in the packet header. If a packet buffer becomes empty (implying packet loss or a network latency condition that exceeds the buffer tolerance) the packet buffer refills before packet processing commences. In one embodiment, a CORB memory error is flagged (via a CMEI interrupt) to signal the audio samples may be shifted in time and the packet buffer may not be optimized for the present network latency. If reset is asserted (CRST#), packet de-multiplexing continues but de-multiplexing of inbound frames and extraction of codec responses is halted. Packets currently in the packet buffer are de-multiplexed into frames so that frame header information can be recovered. Audio data associated with packets is flushed and stream pipelines are re-initialized.

Clock signal 422 provides reference timing for host timing and control module 540. Module 540 includes separate frame timing circuits for outbound and inbound frames using outbound and inbound reference counters. Timing for the reference counters is provided by clock 422 and the frame synchronization signal timing of each is adjustable by speedup and slowdown timing control parameters. In the case of outbound packets, speedup and slowdown timing control requests are issued by client module 440 (ref FIG. 4) based on the output packet buffer fill level at client module 440. In the case of inbound packets, speedup and slowdown timing control requests are issued locally by module 520 based on the current fill level of the input packet buffer. Module 540 responds to these timing control requests by increasing or decreasing the nominal time required to generate frame synchronization signals 546 and 548. Module 540 also provides DMA timing signal 542 for DMA modules in host interface 500. By associating the DMA timing with the frame timing, codec responses may be returned to system memory at a rate expected by the audio software. In the described embodiment, module 540 also supports command and response processing functions. In an outbound direction, command intercept interface 592 processes codec commands from interface 502 before they are multiplexed in outbound frames. This feature enables the filtering of codec commands based on codec command type. In one embodiment, a command filter ensures that only a single instance of a codec command is communicated to client module 440 even if multiple instances of the same command are queued in the command buffer. This prevents the issue of redundant commands in the case of system initialization or error recovery. In another embodiment, a command table enables command substitution, blocking or other filtering functions. In the embodiment, a codec command arriving on interface 502 is intercepted by module 540 using interface 592. The command is processed by module 540 and the modified command returned to outbound packet generator 510 on interface 592 for insertion in an outbound frame. Module 540 uses control interface 596 to register set 530 to read configuration parameters.

In one embodiment, interface 534 is also used to support the immediate command interface as specified by the HD Audio specification. CPU 404 (FIG. 4) writes immediate commands to register set 530. Packet generator 510 accesses the commands on interface 534 for insertion in an outbound frame. In an inbound direction, response intercept interface 594 processes inbound responses from processing module 520 before they are forwarded to response interface 506. This feature enables immediate responses and the filtering of inbound responses based on response type. In one embodiment, responses are issued immediately by module 540 when certain commands are intercepted on interface 592. For example, a series of predetermined initialization responses are issued to the driver in response to a series of known initialization commands, thereby decreasing codec initialization time delays introduced by network latency. In another embodiment, a response filter ensures that only a single instance of an inbound response is communicated to response interface 506 even if multiple instances of the same response are returned by client module 440. This prevents the forwarding of redundant responses to the host in the case of system initialization or error recovery. In the embodiment, a response arriving from network interface 452 is intercepted by module 540 using interface 594. The response is processed by module 540 and the modified response returned to processing module 520 on interface 594 for insertion in the response buffer.

In an alternative embodiment of the present invention, module 400 uses signal processing techniques to optimize stream transfer in either direction.

As an example of outbound signal processing, outbound packet generator 510 includes audio compression functionality. In the embodiment, one or more output audio streams are compressed using any of several methods including Adaptive Differential Pulse Code Modulation (ADPCM), Code Excited Linear prediction (CELP), Adaptive Multi-Rate (AMR) or other methods. When audio compression is used, the compression function is matched with an equivalent decompression function that is executed in a signal processing function in client controller 440. In another embodiment that supports silence suppression, outbound packet generator 510 includes silence suppression functionality to reduce the bandwidth of the outbound streams. In another embodiment that supports compression of input audio streams, processing module 520 includes signal processing functions to decompress audio streams compressed by client audio controller 440 (in FIG. 4). In yet another embodiment that enables audio transmission using a best-efforts protocol such as UDP/IP, processing module 520 executes signal processing-based packet loss concealment methods to recover audio data associated with lost input audio packets. Other embodiments exist. For example, the operation of network interface 550 may be coordinated with signal processing functions. One example is the coordination of the network transfer protocol with packet loss concealment methods and the levels of data buffers. Retransmission of lost packets may be requested if there is sufficient time while signal processing methods are concurrently used to conceal the missing data should it not arrive in time. In another variation, signal processing is coordinated to provide forward error correction to reduce or eliminate the effects of lost or fragmented packets.

Figure 6:
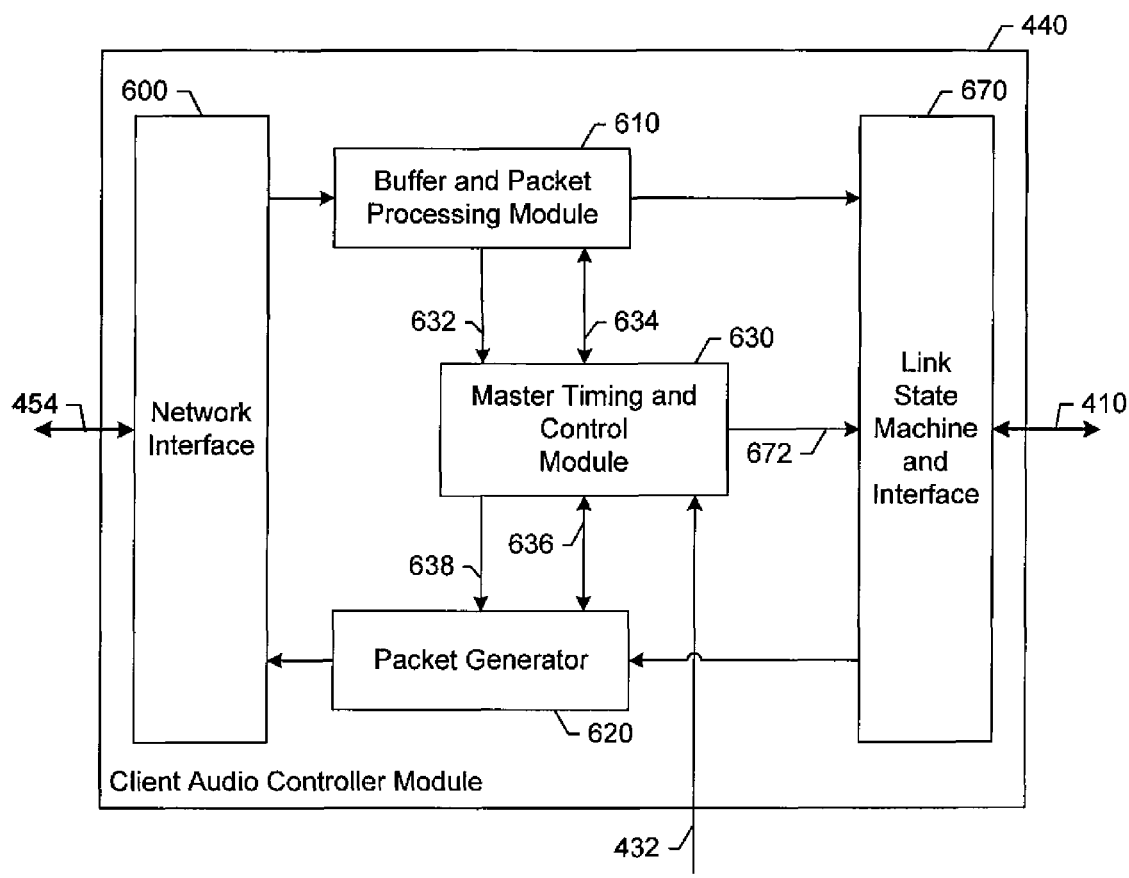
FIG. 6 shows an embodiment of a client audio controller module.

FIG. 6 shows an embodiment of client audio controller module 440 in FIG. 4. The described embodiment is comprised of two timing domains. Firstly a packet timing domain includes network interface 600, buffer and packet processing module 610 and packet generator 620. Secondly, a frame timing domain including master timing and control module 630 and link state machine and interface 670 operates at a rate determined by the frame timing requirements of audio link 410 driven by link clock 432. In the embodiment, module 630 generates link timing signal 672 from clock signal 432. In an alternative embodiment, the audio link timing domain is extended include module 610 and generator 620.

Outbound audio packets including operational control information and outbound frames are received from host audio controller module 400 (in FIG. 4) on network interface 600, stripped of network protocol information and forwarded to processing module 610 where they are stored in an outbound packet buffer. Processing module 610 processes the operational control information and audio frames in the packet payload. Control information is forwarded to master timing and control module 630 over control interface 632. Outbound frames are extracted from the packets in the packet buffer at a frame rate determined by interface 670. The packet buffer in processing module 610 is de-activated at reset so that initial outbound packets comprising codec command frames and operational control information are immediately processed. Once one or more output audio streams become active, host module 400 sends a control request to processing module to activate the packet buffer. At this point, the packet buffer primes itself by waiting until a defined minimum buffer threshold is reached before output audio stream processing commences, for example using the priming method enabled in FIG. 9. If the packet buffer becomes empty (implying packet loss), the packet buffer is re-primed before output audio stream processing may continue.

System timing synchronization is achieved by controlling the fill level of the outbound packet buffer of processing module 610. In one embodiment, a slowdown control request is issued when the packet buffer fill level exceeds a threshold and a speedup control request is issues when the buffer fill level drops below the same threshold. Speedup and slowdown requests are sent to module 630 over interface 632. Module 630 then sends the requests to packet generator 620 over control interface 638 that appends them to inbound packets as operational control information destined for host controller 400. In an alternative embodiment, high and low watermarks are maintained and slowdown and speedup requests are issued when buffer fill levels violate the thresholds. A 'nominal playout speed' request may be issued when the buffer level is in range, reducing overall network control traffic. In one embodiment, module 630 detects under-run conditions in active output audio streams by enabling a stream gap counter that monitors for excessive gaps in output audio frames and sends error information to host module 400 when an under-run is detected.

In the described embodiment, any pending outbound frames queued in interface 670 are purged when a reset is issued (e.g. an HD Audio CRST# assertion forwarded to client controller 440 as a control instruction). In the described embodiment, interface 670 provides the same functions as interface 210 in FIG. 2. It provides an interface between link 110 and modules 610 or 620 in order to transmit output audio data and commands, receive input audio data and responses, communicates codec control information, distribute the sample clock and provide standard bus reset and initialization functions described in the HD Audio specification.

In an inbound direction, packet generator 620 adds timing requests and other operational control information received over control interface 638 to inbound frames from interface 670. If no active input audio streams are present (for example using the discontinuity detection method enabled in FIG. 10), an operational control request is issued to processing module 520 of host controller 400 (ref FIG. 5) to de-activate the inbound packet buffer so that response frames and control information may be processed at low latency. In the case that inbound response frames are present but all audio streams are inactive, responses and control information are multiplexed in packets without audio data and immediately transmitted. When packet generator 620 detects the re-activation of an input audio stream, an operational control request that re-activates the inbound packet buffer in processing module 520 (ref. FIG. 5) is issued.

In an alternative embodiment of the present invention, client module 440 also supports command and response processing functions. In an outbound direction, command intercept interface 634 processes outbound commands before they are sent to interface 670. This feature enables the snooping of outbound frames for various information, for example, to detect audio data type in cases where signal processing is used. In an inbound direction, response intercept interface 636 processes inbound responses from interface 670 before they are forwarded to network interface 600. This feature enables the filtering of inbound responses based on response type. In one embodiment, a response filter ensures that only a single instance of pre-defined responses are communicated to the host controller if multiple instances of the same response are returned on link 410. This prevents the forwarding of redundant responses across the network in the case of system initialization or error recovery. In another alternative embodiment, module 440 uses signal processing techniques to optimize stream transfer in either direction. As one example of outbound signal processing, outbound processing module 610 includes audio decompression functionality. In the embodiment, one or more output audio streams (compressed using methods described for processing module 510 in FIG. 5) are decompressed using matching methods. In another embodiment that supports silence suppression, packet generator 620 includes silence suppression functionality to reduce the bandwidth of the inbound streams. In another embodiment that supports compression of input audio streams, packet generator 620 compresses audio streams prior to packet transmission. In yet another embodiment that enables audio transmission using a best-efforts protocol such as UDP/IP, processing module 610 executes packet loss concealment methods to recover audio data associated with lost input audio packets. In another embodiment, network interface 600 marks some packets for priority transfer using QoS characterization, for example setting the TOS field in the MAC header. Other embodiments exist. For example, the operation of network interface 600 may be coordinated with signal processing functions as described in FIG. 5.

Figure 7:
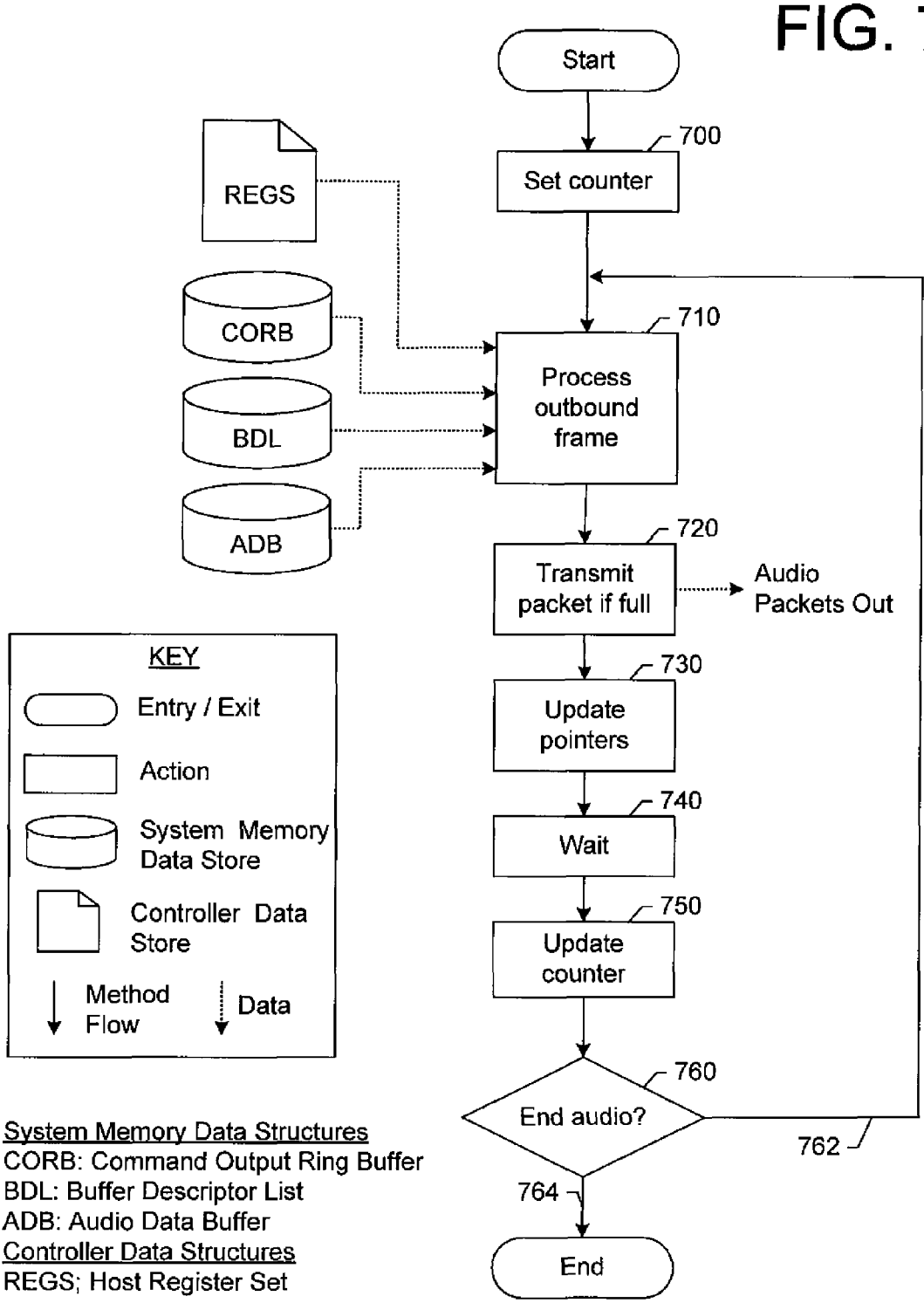
FIG. 7 is a flowchart of an output audio processing method as might be executed by a host audio controller module.

FIG. 7 is a flowchart of an output audio processing method as might be executed by host audio controller module 400 in FIG. 4. As a first step 700, a counter is initialized to an expected frame period, for example as defined by the frame period of audio link 410 in FIG. 4. In the described embodiment, an adjustable counter driven by clock signal 422 in FIG. 4 is set to an initial start value and counts down to zero over the course of each frame cycle. The start value of the counter is selected such that an approximate frame time is counted over each count down cycle. However, given that clock signal 422 (ref. FIG. 4) at host system 460 (ref. FIG. 4) is not synchronized with clock 432 (ref. FIG. 4) at client system 470 (ref. FIG. 4), the count down cycle is repeatedly adjusted such that, over a period of time, the outbound frame processing rate at host system 460 matches the frame rate at link 410. As a next step 710, an output audio frame is generated and processed. Note that variables are held fixed during frame processing to avoid making premature decisions on data or information that may be subject to subsequent change. Output audio data is acquired from one or more audio data buffers and multiplexed with codec command information when available. In one embodiment, output audio data is acquired in HD Audio specified host container format from cyclic buffers in system memory 406 (ref. FIG. 4) described by a buffer descriptor list and multiplexed with codec command verbs stored in CORB data structures in system memory 406. Register updates initiated by audio drivers and other control overheads are added to the frame header prior to transmission.

As a next step 720, the output audio packet is transmitted if the packet is full based on the number of frames inserted. A full packet is pre-determined based on an optimum packet size for the network configuration and desired latency. Operational control information including packet buffer control instructions for the client audio controller module are added to the packet prior to transmission. As a next step 730, address pointer values in host audio controller module 400 are updated to reflect the changes to CORB and cyclic buffers based on the audio content and information moved to the outbound audio packet. As a next step 740, a pause is initiated until the counter set in step 700 reaches zero which signals that the next outbound frame should be processed. As a next step 750, the counter is re-initialized using the previous start value or an updated start value provided by client audio controller 440 (FIG. 4) based on the output packet buffer fill level.

As a next step 760, an audio termination check is executed. In case 762, audio processing continues and the method repeats from step 710. In case 764, audio processing does not continue and the method is terminated.

Figure 8:
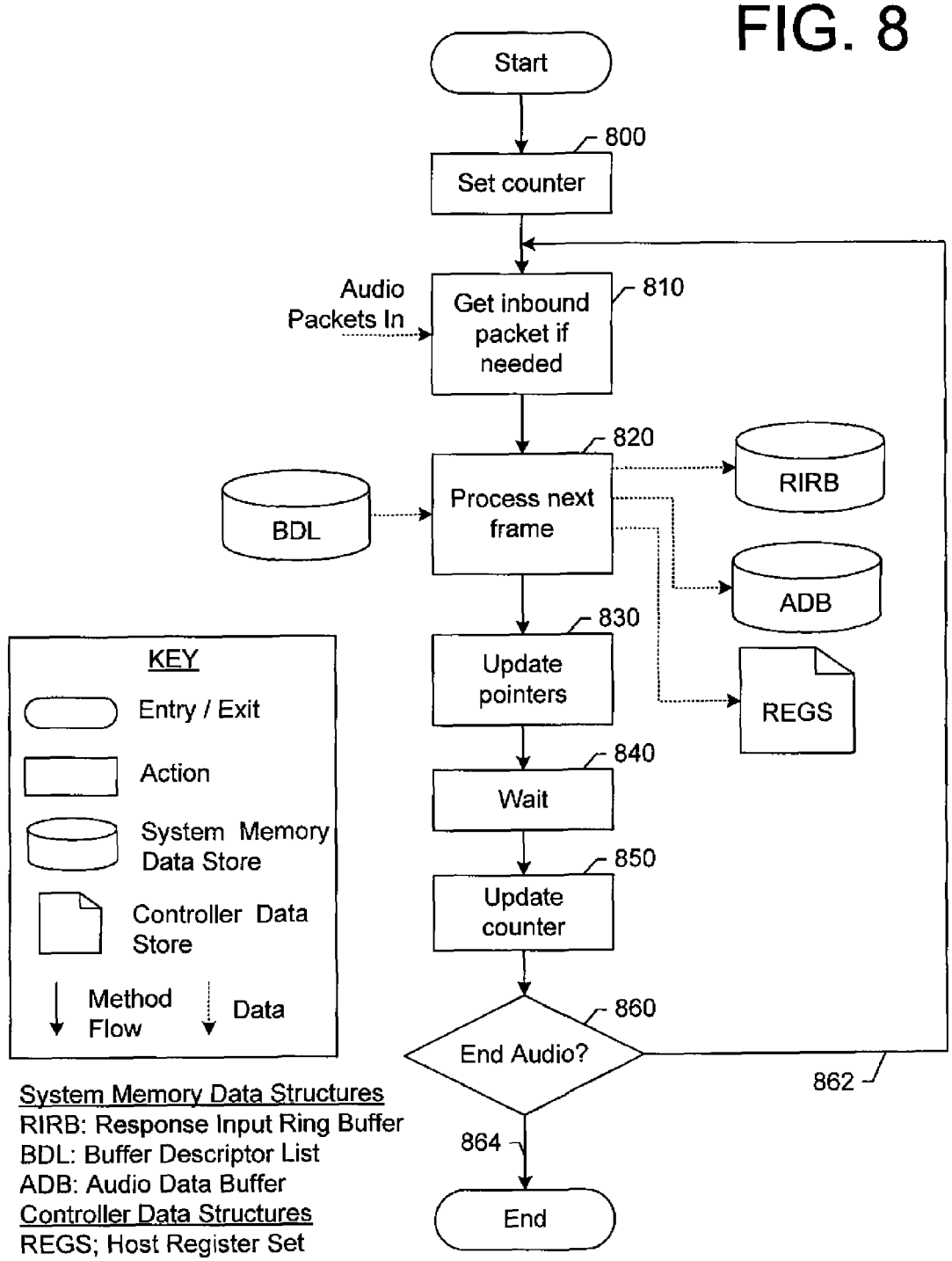
FIG. 8 is a flowchart of an input audio processing method as might be executed by a host audio controller module.

FIG. 8 is a flowchart of an input audio processing method as might be executed by host audio controller module 400 in FIG. 4. As a first step 800, a counter is initialized to an expected audio frame processing period, for example as defined by the frame period of audio link 410 in FIG. 4. In the described embodiment, an adjustable counter driven by clock signal 422 in FIG. 4 is set to an initial start value and counts down to zero over the course of each frame period. The start value of the counter is selected such that an approximate frame time is counted over each count down cycle. However, given that clock signal 422 (ref FIG. 4) at host system 460 (ref. FIG. 4) is not synchronized with clock 432 (ref. FIG. 4) at client system 470 (ref. FIG. 4), the count down cycle is repeatedly adjusted such that, over a period of time, the inbound frame processing rate at host system 460 matches the frame rate at link 410. As a next step 810, an inbound packet is acquired from an input packet buffer if the previous packet has been fully processed. If the previous packet has unprocessed frames, step 810 is skipped.

At step 820, the next frame in the inbound packet is processed. If a new packet is processed, operational information including updated outbound loop timing parameters are also extracted from the packet header. The next frame is de-multiplexed into frame overhead control information, input audio stream data and codec responses which are written to audio data buffers and response data structures in system memory. In the described embodiment, input audio streams are stored in HD Audio specified host container format in cyclic buffers in system memory 406 described by a buffer descriptor list. Each response is stored in a RIRB data structure, also located in system memory 406. Frame overhead control information including CRST# is processed as illustrated in FIG. 6.

As a next step 830, address pointer values in host audio controller module 400 are updated to reflect the recently received data updates to the RIRB and cyclic buffers. As a next step 840, a pause is initiated until the counter set in step 800 reaches zero which signals that the next frame should be processed. As a next step 850, the counter is re-initialized using the previous start value or an updated start value based on the current fill level of the input packet buffer. As a next step 860, an audio termination check is executed. In case 862, audio processing continues and the method repeats from step 810. In case 864, audio processing does not continue and the method is terminated.

Figure 9:
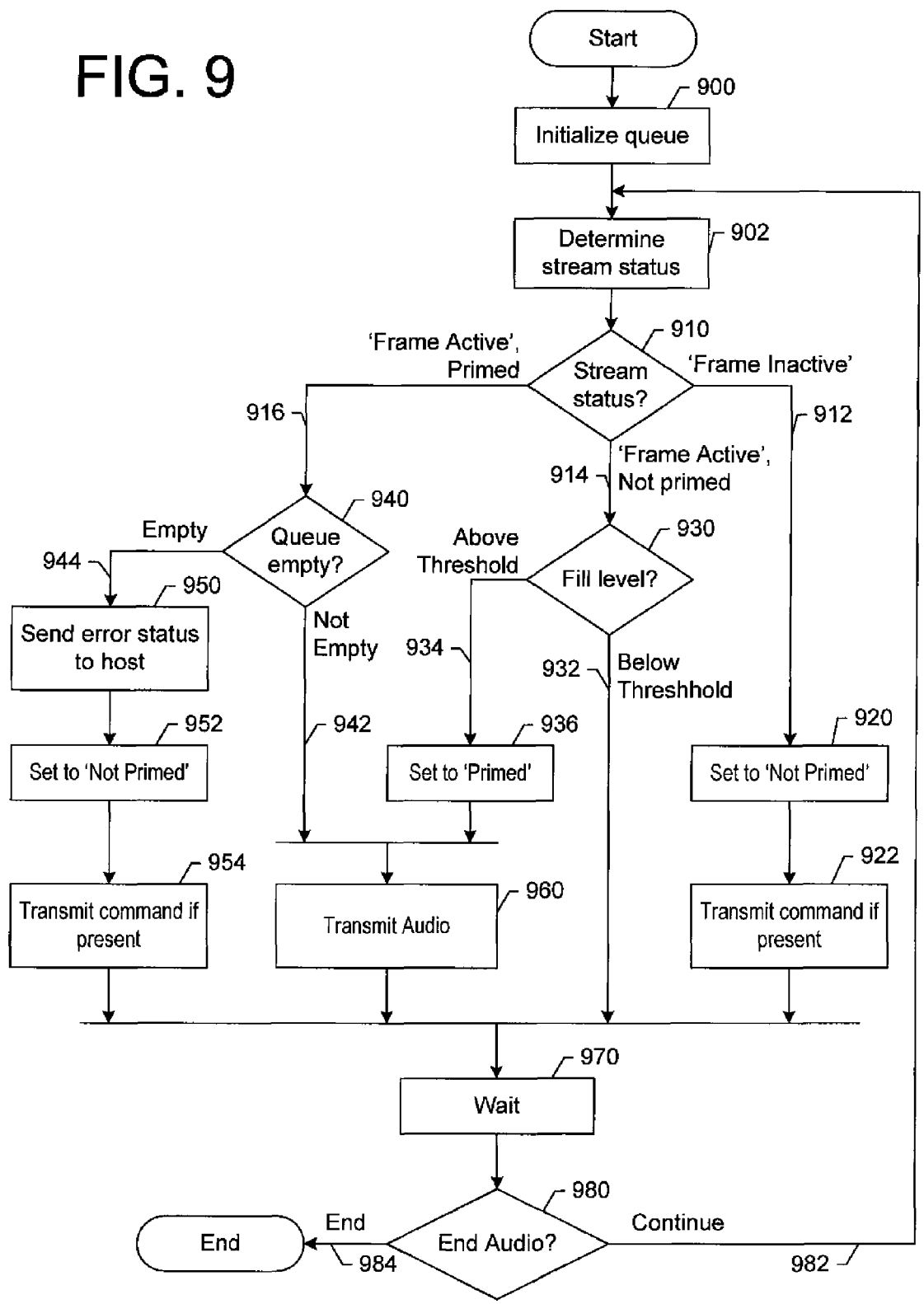
FIG. 9 is a flowchart showing a method for detecting an underflow in an output audio stream as might be executed by a client audio controller module.

FIG. 9 is a flowchart showing a method for detecting an underflow condition in an output audio stream as might be executed by module 440. As a first step 900, an output audio packet queue is initialized. In the described embodiment, initialization involves configuring a new queue or resetting an existing queue, setting a minimum threshold above which the queue is primed and marking the queue as initially 'not primed'. Once the queue becomes primed, output audio streams may be processed. The method described by FIG. 9 uses the term 'queue' to refer to a packet buffer as located in module 610 in FIG. 6. In an alternative embodiment, a queue may be comprised of the combination of a packet buffer in the packet timing domain and a frame queue in the link timing domain as might be located in interface 670. In such an alternative embodiment, queue status is determined by evaluating the frame queue connected to the audio link.

As a next step 902, the stream status is determined. In the described embodiment, the status is determined by evaluating the status of the oldest frame in the queue (or the previous status associated with the last valid frame in case where the queue is now empty) and evaluating whether or not the queue is marked as 'primed' or 'not primed'. In the embodiment, each frame in the queue is independently marked as either being 'frame active' or 'frame inactive'. If a frame is marked as 'frame active' (as marked by packet generator 510 in FIG. 5), the frame is expected to contain valid output audio data. If a frame is marked as 'frame inactive', no output audio data is present but the frame may contain an outbound command or control information. The 'primed'/'not primed' status is evaluated by checking a flag associated with the queue.

In an alternative embodiment, rather than each frame being individually marked as 'frame active' or 'frame inactive', status is specified at a packet level in the packet header and step 902 is used to derive frame active status. In the alternative embodiment, each outbound packet is marked as 'stream active' or 'stream inactive'. If a packet header is marked as 'stream active', all frames in the queue are designated as 'frame active'. When the packet header changes from 'stream active' to 'stream inactive', a final output audio stream is expected to terminate within the packet but 'active' frames must be flushed. Therefore all frames of the present packet are designated 'frame active' but all frames associated with subsequent packets are designated 'frame inactive' until such time as a new packet header with 'stream active' is received. Packet status is stored in a register following the interpretation of each packet header.

At step 910, the method branches based on stream status. In case 912, the frame is inactive so the queue is set to not primed as next step 920 and a command is transmitted if present in the frame as step 922. The method then waits on a frame timing signal as a next step 970. In case 914, at the frame is 'active' but the queue is marked as 'not primed' so the fill level is checked as next step 930. In case 932, the fill level remains below a priming threshold so no output audio is transmitted and the described method waits on a frame timing signal as next step 970.

In case 934 the queue fill level is above the minimum threshold so the queue is marked as 'primed' as next step 936 and the output audio data in the frame (and command if present) are transmitted as next step 960. The described method then also waits on a frame timing signal as next step 970. In case 916, the frame is 'active' and the queue is marked as 'primed' so the queue level is checked as next step 940. In case 942, the queue is not empty so the output audio data in the frame (and command if present) are transmitted as next step 960. The described method then also waits on a frame timing signal as next step 970. In case 944, the queue is empty which identifies an output audio underflow condition. In this case, an error status message is assembled for transmission to host module 400 (ref FIG. 4) in the next inbound packet as step 950. In one embodiment, host module 400 sets the HD Audio FIFO Empty flag (FIFOE) to signal the underflow condition to the audio software. In another embodiment, host module 400 issues a reset instruction. Once an underflow condition has been detected, the packet buffer is marked as 'not primed' in step 952 to prevent further error messages being transmitted until the buffer has once again been primed with output audio stream data. A command is transmitted if present in the frame as next step 954 and the method then waits on a frame timing signal as a next step 970. Following step 970, the described method is then tests for possible termination as step 980. In case 982, the method continues and repeats from step 910. In case 984, the method is terminated.

Figure 10:
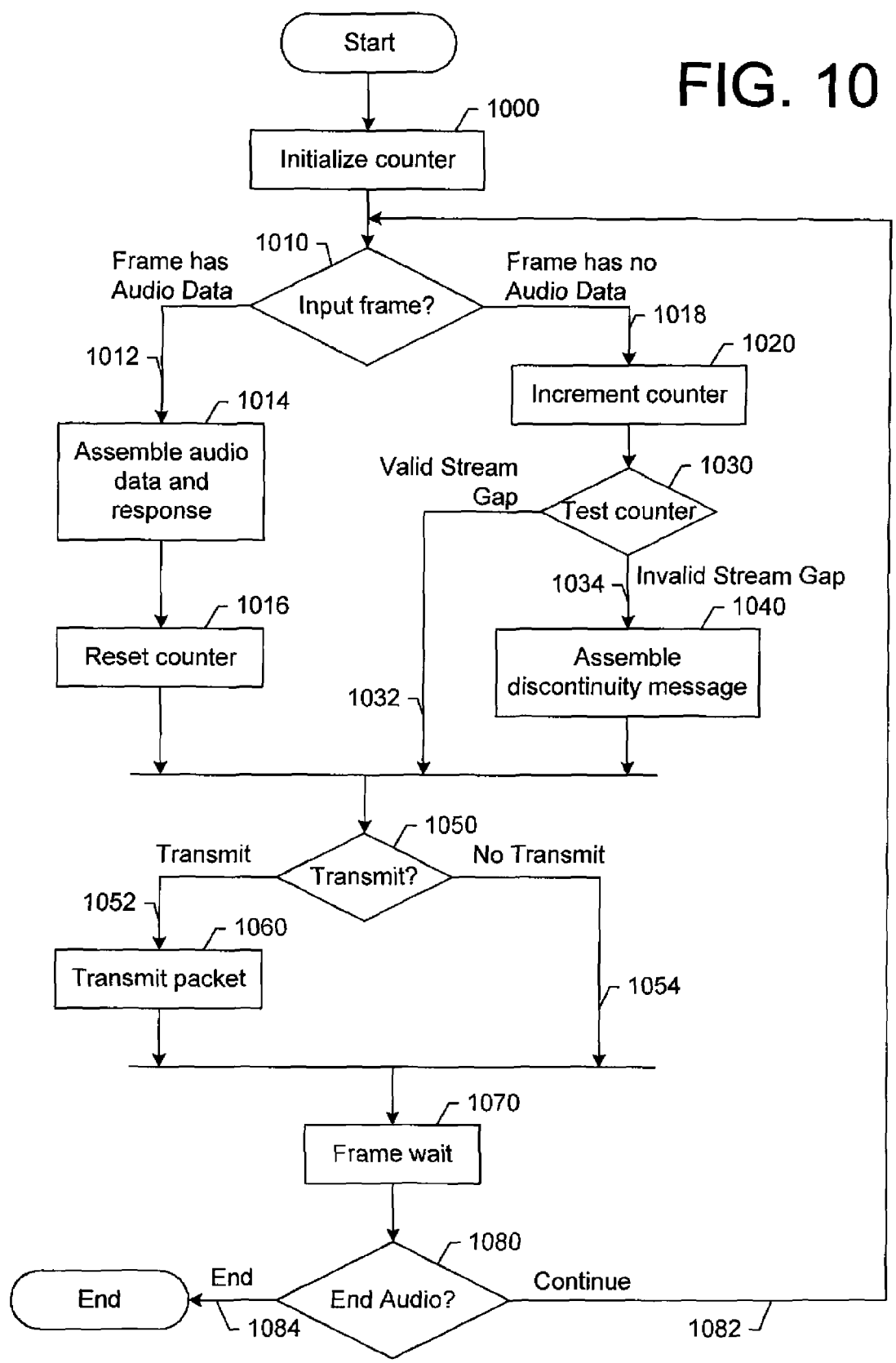
FIG. 10 is a flowchart illustrating a method for identifying a discontinuity in an input audio stream using a stream gap counter.

FIG. 10 is a flowchart illustrating a method for detecting the termination of input audio streams by identifying a discontinuity in an input audio stream as might be executed by client module 440 in FIG. 4 so that packet buffers in host audio controller module 400 may be disabled when all input audio streams have terminated. In the described embodiment, a stream gap counter detects audio gaps and host module 400 in FIG. 4 is notified.

As a first step 1000, a stream gap counter used to test the length of a gap in an audio stream is initialized to zero. At step 1010, an inbound frame is checked for input audio stream data. In the described embodiment, the next input frame from interface 670 (FIG. 6) is checked for audio stream data. In case 1012, the frame has input audio stream data so the frame is added to the next inbound audio packet as step 1014. In the case that a codec response is also available, the response is also added to the inbound audio packet. At step 1016, the stream gap counter is reset and packet transmission test 1050 is executed as a next step. In case 1018, the frame has no input audio stream data so the stream gap counter is incremented as step 1020 and tested as next step 1030. In case 1032, the gap in the stream is valid (i.e. sufficiently short that the gap may be an expected gap caused by a low audio sample rate) and packet transmission test 1050 is executed as a next step. In case 1034, the gap exceeds a defined threshold that identifies a discontinuity in the stream. A discontinuity message is assembled and added to the next inbound packet as next step 1040. In the described embodiment, only one discontinuity message is assembled for each detected gap in a stream. This may be accomplished by setting a flag when a message is sent and resetting the flag when the stream gap counter is reset. The stream gap counter should also be prevented from rolling over when incremented in step 1020.

Packet transmission test 1050 is executed as a next step. In case 1052, the packet is full and transmitted to host audio controller 400 (in FIG. 4) as step 1060. In the described embodiment, a packet is ready for transmission when it has a predetermined quantity of frames, a discontinuity message has been assembled in step 1040 or a late packet transmission timer expires, for example after a predefined timeout since previous frame data was added to an existing packet. The packet is then passed to network interface 600 (FIG. 6) where it is transmitted using an asynchronous method and then waits on a frame pulse At step 1070. In case 1054, the packet is not ready for transmission so the described method waits on a frame pulse as next step 1070. At step 1070, a wait is performed for a signal indicating the arrival of the next frame. The described method is then tested for possible termination as step 1080. In case 1082, the method continues and repeats from step 1010. In case 1084, the method is terminated.

Figure 11:
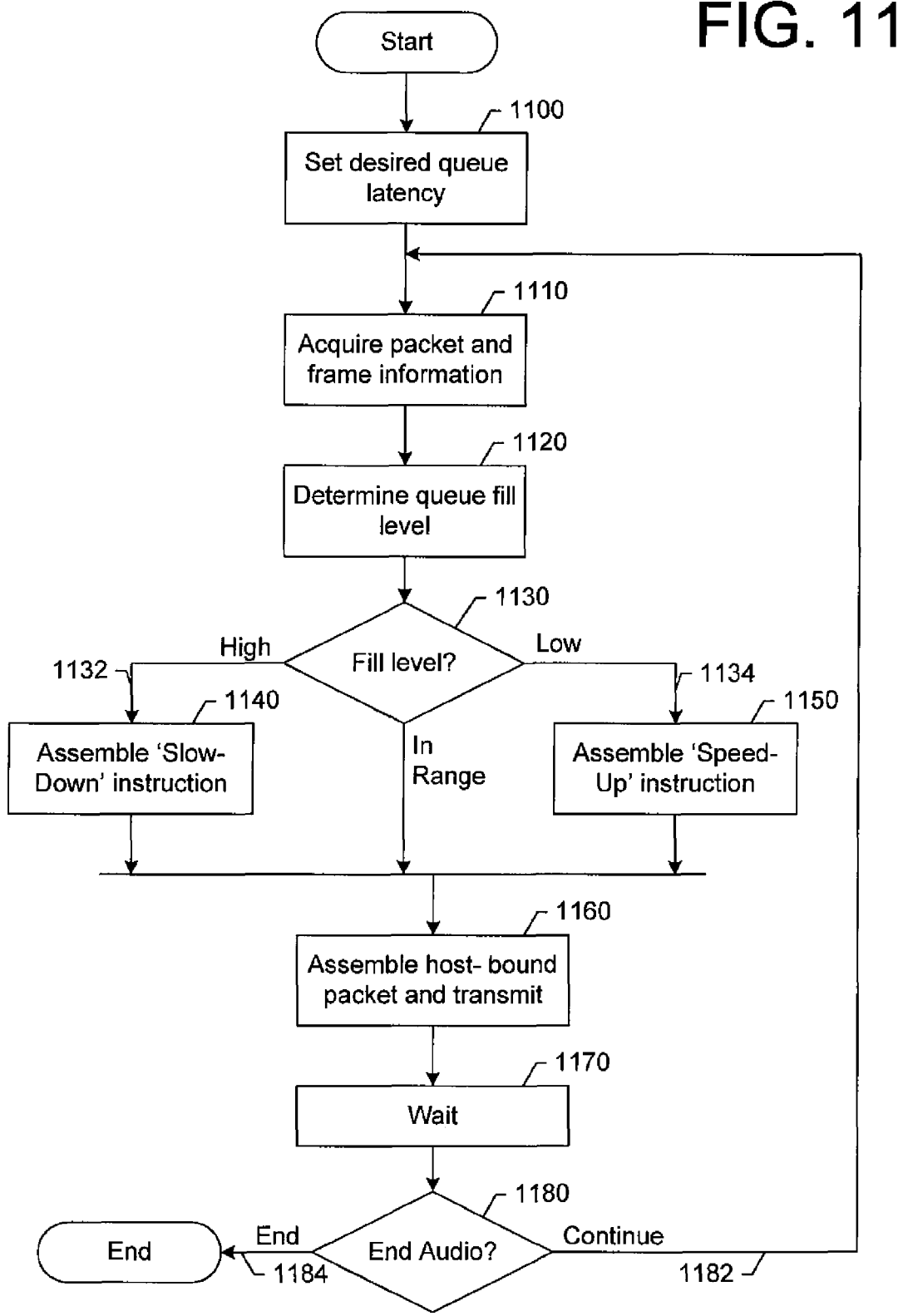
FIG. 11 is a flowchart that illustrates a method in which an outbound frame rate from a host audio controller is controlled by a client audio controller based on packet information.

FIG. 11 is a flowchart that illustrates a method in which the outbound frame rate from a host audio controller is controlled by a client audio controller as might be executed by module 440 (in FIG. 4). As a first step 1100, a desired output audio queue depth (in number of frames) is established and the queue configured. Note that a 'queue' may be a single queue or a combination of packet buffer and queue as described by FIG. 9. In the described embodiment, a queue capable of buffering a fixed maximum number of frames is configured with an optimum desired fill level that provides a frame latency of an optimum period of time.

At step 1110, packet and frame information is acquired using outbound packet information when data for the next inbound packet is available for transmission and a rate transmission instruction is required. In the described embodiment, the number of frames per packet is determined based on the number of frames in the oldest packet at the head of the queue. In alternative embodiments, other metrics such as the number of bytes per packet may be acquired from the packet header.

At step 1120, an approximate current queue fill level is determined in terms of number of frames or number of bytes. This is achieved by multiplying the number of packets in the queue by the number of frames in the oldest packet at the head of the queue, where each frame is comprised of an associated number of bytes.

At step 1130, the approximated current queue fill level is compared with the desired fill level established in step 1100. In case 1132, the approximated fill level is higher that the desired fill level and a slowdown instruction is assembled as step 1140 followed by packet assembly step 1160. In case 1134, the approximated fill level is lower that the desired fill level and a speedup instruction is assembled as step 1150 followed by packet assembly step 1160. In an alternative embodiment, step 1130 compares the approximate fill level against high and low watermarks rather than a single threshold. In the alternative embodiment, an approximate fill level between the two watermarks results in case 1136 where no instruction is assembled as the fill level is in a desired range. In the alternative embodiment, module 400 maintains its previous timing when no new timing instruction is received. In another alternative embodiment, the desired optimum queue level may be adjusted during the method based on changed network conditions, trends in number of frames per packet or other variations.

A host bound packet is assembled and transmitted At step 1160. In the described embodiment, speed-related instructions are assembled once for each inbound packet sent to the host. In one embodiment, speed-related instruction may be calculated for each iteration of the method and assembled based on the queue status immediately prior to inbound packet transmission. In another embodiment, the calculation is performed once per inbound packet. Other embodiments are also feasible. The assembled packet is sent to a network interface and transmitted using an asynchronous method.

As an next step 1170, the described method pauses until inbound data for a next packet is available for transmission to host module 400 (ref FIG. 4). The described method is then tested for possible termination as step 1180. In case 1182, the method continues and repeats from step 1110. In case 1184, the method terminates.

Figure 12:
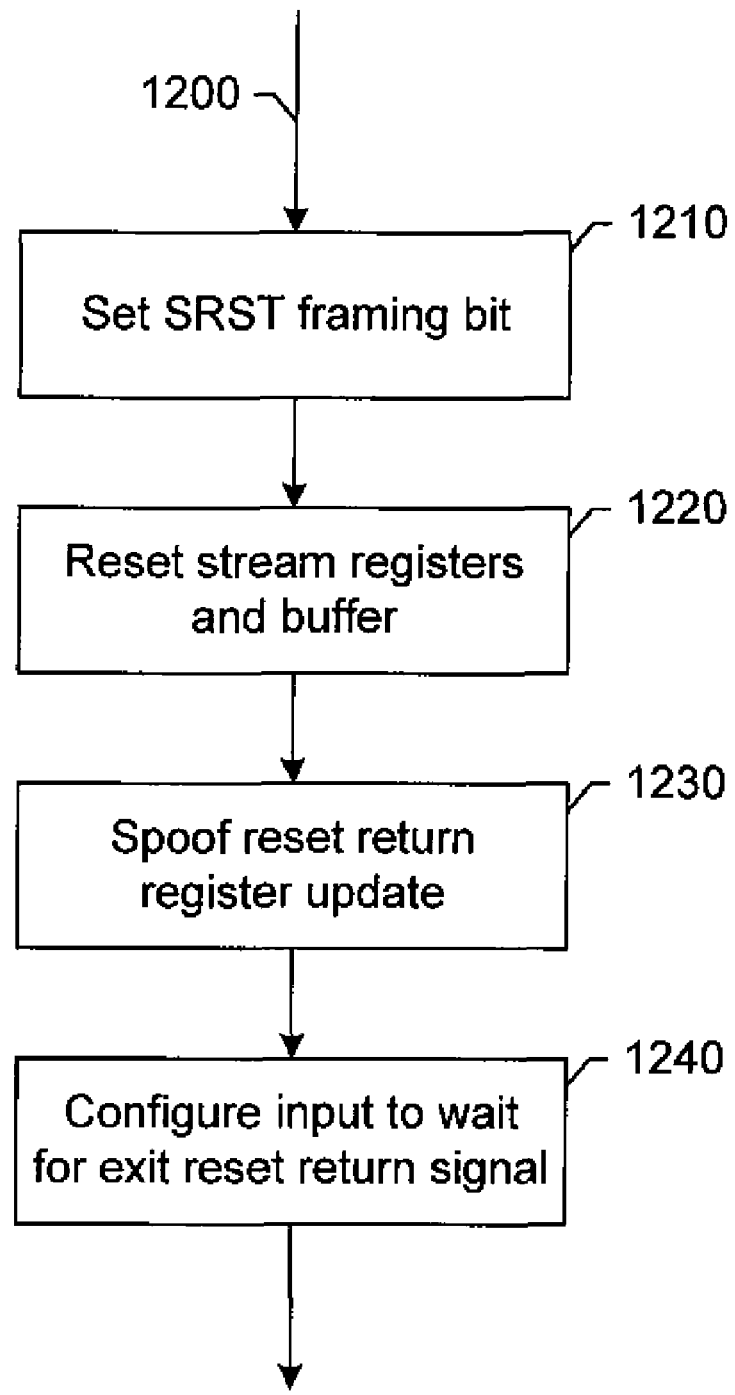
FIG. 12 is a flowchart of a method used by a host audio controller module to reset an individual input audio stream by spoofing a client response to the host audio software.

FIG. 12 is a flowchart of a method used by host audio controller module 400 (ref. FIG. 4) to reset an individual input audio stream by spoofing a client response to the host audio software. The described method is initiated when a stream reset (SRST) register is asserted by host audio software. In case 1200, an SRST register is asserted. The SRST framing bit for the stream is set as step 1210. In the embodiment described by FIG. 5, packet generator 510 receives SRST change information on register interface 534 and updates the associated framing bit before the frame is sent in an outbound packet to client system 440.

At step 1220, the stream registers and buffers are reset. In the embodiment described by FIG. 5 stream buffers in host interface 500 are flushed in host module 400 and module 520 is configured to drop any buffered or future input audio data associated with the stream until the de-assertion of the reset. In the client embodiment described by FIG. 6, module 630 receives the SRST framing bit on control interface 632 and forwards it to packet generator 620 on control interface 638 where it is looped back to host controller 400. In an alternative embodiment, packet generator 620 is configured to drop input audio data associated with the reset stream.

At step 1230, the return register update is spoofed. Note that step 1230 does not wait for a transmission and loopback of the SRST framing bit before commencing. In the embodiment described by FIG. 5, host module 540 updates the SRST by setting the SRST bit. Note that this differs from a non-bridged embodiment because the inbound stream may still have stream data in transit where a non-bridged embodiment only reports SRST as set once the stream hardware pipeline has completed reset.

At step 1240, the input is configured to wait for a reset exit signal which only occurs once audio software has de-asserted SRST and this signal has looped round through the client system. In the embodiment described by FIG. 5, module 520 is configured to monitor the SRST framing bit of inbound frames. Once it detects a de-asserted SRST bit, new stream data following the de-assertion is forwarded to stream buffers in host interface 500.

Figure 13:
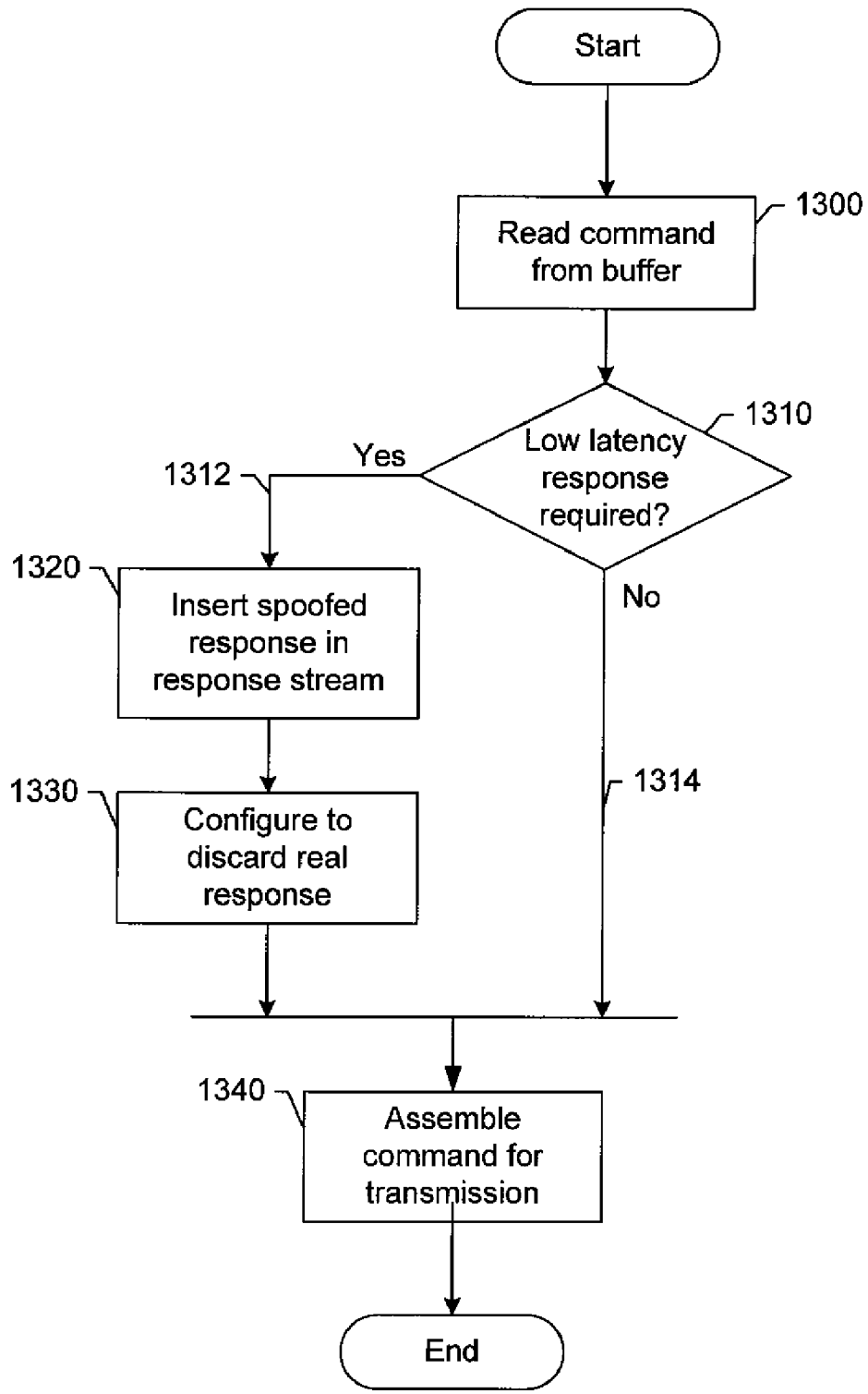
FIG. 13 is a flowchart of a method of providing a low latency response to a predetermined set of commands using the response DMA stream.

FIG. 13 is a flowchart of a method of providing a low latency response to a predetermined set of commands using the response DMA stream. This is useful for accelerating the initialization of an audio driver that re-transmits initialization commands in the case of a delayed response. By immediately spoofing the expected response and discarding the delayed response, the driver is prevented from re-issuing commands and performance is improved. Referring to FIG. 13, the first or next command is read from the command buffer as step 1300. In the embodiment described by FIG. 5, packet generator 510 reads the command on interface 502.

At step 1310, a determination is made as to whether a low latency response is required. In the embodiment described by FIG. 5, module 540 maintains a list of commands that require a low latency response and monitors commands on interface 592. The list also stores a desired response for each command. Each outbound command from interface 502 is then compared with the command list.

In case 1312, a low-latency response is required so a spoofed response is inserted in the response stream as next step 1320. In the embodiment described by FIG. 5, module 540 uses response interface 594 to forward the desired low latency response to module 520. Module 520 then forwards the response across interface 506 to the response buffer in host interface 500. At step 1330, the system is configured to discard the real response expected to arrive from a codec after a delay. In the embodiment described in FIG. 5, module 520 is configured to drop the inbound response when it arrives.

In case 1314, the command does not require a low latency response so no response is returned to the response buffer. As a final step 1340, the command is assembled for transmission across the network to the client system. In an alternative embodiment, rather than spoofing an immediate response, commands that are issued multiple times are filtered so that the codec only receives the original command and therefore only generates a single response.

While methods and apparatus for bridging an audio controller have been described and illustrated in detail, it is to be understood that many changes and modifications can be made to various embodiments of the present invention without departing from the spirit thereof.

What is claimed is:

1. A method of communicating audio data and commands from a host computer to a client computer, comprising:
   acquiring, by a Direct Memory Access Controller (DMAC), audio data from at least one audio buffer of a plurality of audio buffers and audio commands from at least one command buffer, the plurality of audio buffers described by a descriptor list, the acquired audio data and commands sufficient in duration to be transmitted from a client computer to at lease one codec over a first period of time;

determining the first period of time from timing control parameters received via an Internet Protocol (IP) network between the host computer and the client computer;

assembling into at least one transmit IP network packet the acquired audio data and audio commands; and if the assembled audio data and commands achieves a pre-determined number of audio frames, then transmitting to the client computer, via the IP network, the assembled at least one transmit IP network packet, wherein acquiring audio data and audio commands further comprises:

presenting high definition (HD) audio registers to a processor of the host computer;

reading the HD audio registers to determine register values; and if the register values indicate that a stream reset has been initiated then:

assembling, into the at least one IP network packet, an indication of a stream reset;

resetting stream registers and buffers;

spoofing a reset return register update, the update indicating an acknowledgement of the stream reset, the spoofing satisfying a specified timing requirement for the audio driver of the host computer; and upon receiving a reset exit signal from the client computer and determining that the register values indicate the stream reset has been removed, releasing from reset the stream registers and buffers.

2. The method of claim 1, wherein the stream reset prevents additional audio data transfer to audio data buffers until the register values indicate the stream reset has been removed.

3. The method of claim 1, further comprising determining a spoofing response includes comparing the register values to a predetermined set of commands requiring immediate response.

4. An apparatus for communicating audio data and commands from a host computer to a client computer, the apparatus comprising:

a direct memory access controller (DMAC) acquiring audio data from at least one audio buffer of a plurality of audio buffers and audio commands from at least one command buffer, the plurality of audio buffers described by a descriptor list, the acquired audio data and commands sufficient in duration to be transmitted from a client computer to at lease one codec over a first period of time;

a means for determining the first period of time from timing control parameters received via an Internet Protocol (IP) network between the host computer and the client computer;

a means for assembling into at least one transmit IP network packet the acquired audio data and audio commands; and a means for transmitting to the client computer, via the IP network, the assembled at least one transmit IP network packet if the assembled audio data and commands achieves a pre-determined number of audio frames, the direct memory access controller further presenting high definition (HD) audio registers to a processor of the host computer, reading the HD audio registers to determine register values; and if the register values indicate that a stream reset has been initiated then assembling, into the at least one IP network packet, an indication of a stream reset, resetting stream registers and buffers, spoofing a reset return register update, the update indicating an acknowledgement of the stream reset, the spoofing satisfying a specified timing requirement for the audio driver of the host computer, and upon receiving a reset exit signal from the client computer and determining that the register values indicate the stream reset has been removed, releasing from reset the stream registers and buffers.

5. A non-transitory computer program product containing instructions which, when executed by a computer, perform a method to communicate audio data and commands from a host computer to a client computer, the method comprising:

acquiring, by a Direct Memory Access Controller (DMAC), audio data from at least one audio buffer of a plurality of audio buffers and audio commands from at least one command buffer, the plurality of audio buffers described by a descriptor list, the acquired audio data and commands sufficient in duration to be transmitted from a client computer to at lease one codec over a first period of time;

determining the first period of time from timing control parameters received via and Internet Protocol (IP) network between the host computer and the client computer;

assembling into at least one transmit IP network packet the acquired audio data and audio commands; and if the assembled audio data and commands achieves a pre-determined number of audio frames, then transmitting to the client computer, via the IP network, the assembled at least one transmit IP network packet, wherein acquiring audio data and audio commands further comprises:

presenting high definition (HD) audio registers to a processor of the host computer;

reading the HD audio registers to determine register values; and if the register values indicate that a stream reset has been initiated then:

assembling, into the at least one IP network packet, an indication of a stream reset;

resetting stream registers and buffers;

spoofing a reset return register update, the update indicating an acknowledgement of the stream reset, the spoofing satisfying a specified timing requirement for the audio driver of the host computer; and upon receiving a reset exit signal from the client computer and determining that the register values indicate the stream reset has been removed, releasing from reset the stream registers and buffers.

6. The method of claim 1, wherein the DMAC transfers data based on commands in a Command Output Ring Buffer (CORB) as defined by the High Definition (HD) Audio Specification.

7. The method of claim 1, wherein the timing control parameters include speed-up and slow-down timing control parameters for adjusting a period of the audio frames.

* * * * *